United States Patent
Deetz

(10) Patent No.: US 8,566,288 B1
(45) Date of Patent: Oct. 22, 2013

(54) ORGANIZED DATA REMOVAL OR REDIRECTION FROM A CLONING PROCESS TO ENABLE CLONING A LARGER SYSTEM TO A SMALLER SYSTEM

(75) Inventor: Randall Deetz, Costa Mesa, CA (US)

(73) Assignee: CMS Products, Inc., Costa Mesa, CA (US)

( * ) Notice: Subject to any disclaimer, the term of this patent is extended or adjusted under 35 U.S.C. 154(b) by 27 days.

(21) Appl. No.: 12/871,697

(22) Filed: Aug. 30, 2010

Related U.S. Application Data

(60) Provisional application No. 61/238,645, filed on Aug. 31, 2009, provisional application No. 61/239,406, filed on Sep. 2, 2009.

(51) Int. Cl.
*G06F 7/00* (2006.01)

(52) U.S. Cl.
USPC .......................................................... 707/654

(58) Field of Classification Search
USPC .......................................................... 707/654
See application file for complete search history.

(56) References Cited

U.S. PATENT DOCUMENTS

| | | | |
|---|---|---|---|
| 6,820,214 B1 * | 11/2004 | Cabrera et al. | 714/15 |
| 2006/0259724 A1 * | 11/2006 | Saika | 711/162 |
| 2008/0235299 A1 * | 9/2008 | Haselton et al. | 707/204 |

* cited by examiner

*Primary Examiner* — Jensen Hu
(74) *Attorney, Agent, or Firm* — Law Office of Scott C. Harris, Inc.

(57) ABSTRACT

The present invention is a system to automatically remove sets of pre specified files or divert sets of pre specified files from the files that would normally be sent to a storage device during a backup or cloning operation. The invention is used to allow a backup of a storage device onto a smaller capacity storage device or for creating sets of backups each of which may contain different sets of files from the source storage device. The invention consists of sets of lists which drive the backup engine and provide the intelligence for determining which files are backed up, diverted to another storage device, or not transferred.

18 Claims, 5 Drawing Sheets

ORGANIZED DATA REMOVAL OR REDIRECTION FROM A CLONING PROCESS TO ENABLE CLONING A LARGER SYSTEM TO A SMALLER SYSTEM

This application claims priority from provisional application No. 61/238,645, filed Aug. 31, 2009, and 61/239,406 filed Sep. 2, 2009, the entire contents of which are herewith incorporated by reference.

BACKGROUND

IT departments have for years created sets of storage devices that are placed into desktop and laptop computers. For the most part, creating these storage devices with unique sets of software and data is, at best, a laborious and error prone process. Personal computers carried into the field are notorious for disk drive failures. Attempts to overcome this problem have been dealt with through the use of portable backup solutions ranging from the user transporting a portable storage device to the use of software on a bootable CD or DVD which then accesses a dataset over a network to rebuild the failed storage device.

For some large companies, replacement of thousands of laptops a year and the creation of thousands of replacement storage devices is commonplace. Some large companies attempt to reduce their workloads by requiring the PC vendors to place a corporate image on storage devices contained inside desktops and laptops that are purchased. While alleviating the companies from placing a corporate image onto newly purchased computers, this still requires companies to install unique software programs and unique data sets for each new computer. This also does not address the problem of creating storage devices for failed units.

SUMMARY

Embodiments relate to automating a selective transfer of files from one storage device to another.

Embodiments are intended to overcome the shortcomings and difficulties of manually building software and datasets on individual storage devices on new computers and providing the same storage devices for failed storage devices in existing computers used in offices and for units remotely located in the field.

Embodiments automate the process and reduces the number of human induced errors and improves the quality of the finished storage device.

BRIEF DESCRIPTION OF THE DRAWINGS in the drawings.

Figure 3:
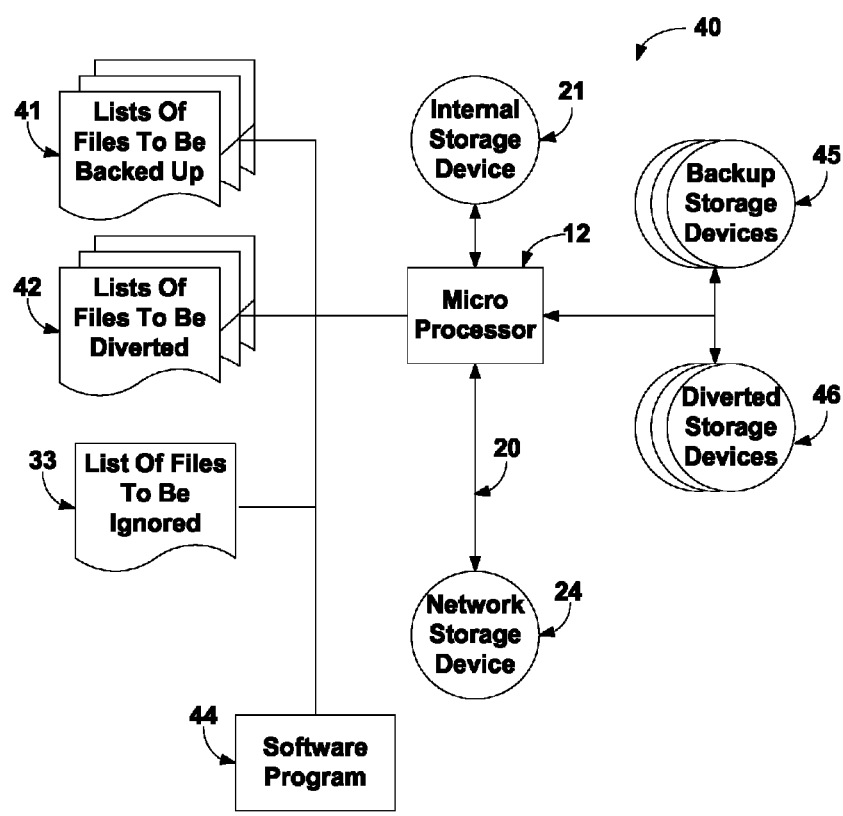

FIG. 3 is a schematic representation of an aspect of the invention where by 2 sets of lists determine which files are to be transferred to the backup storage devices and which files are to be transferred or diverted to the diverted storage devices and a single list that determines which files are to be ignored and not transferred to either the backup storage devices or to the diverted storage devices.

Figure 4:
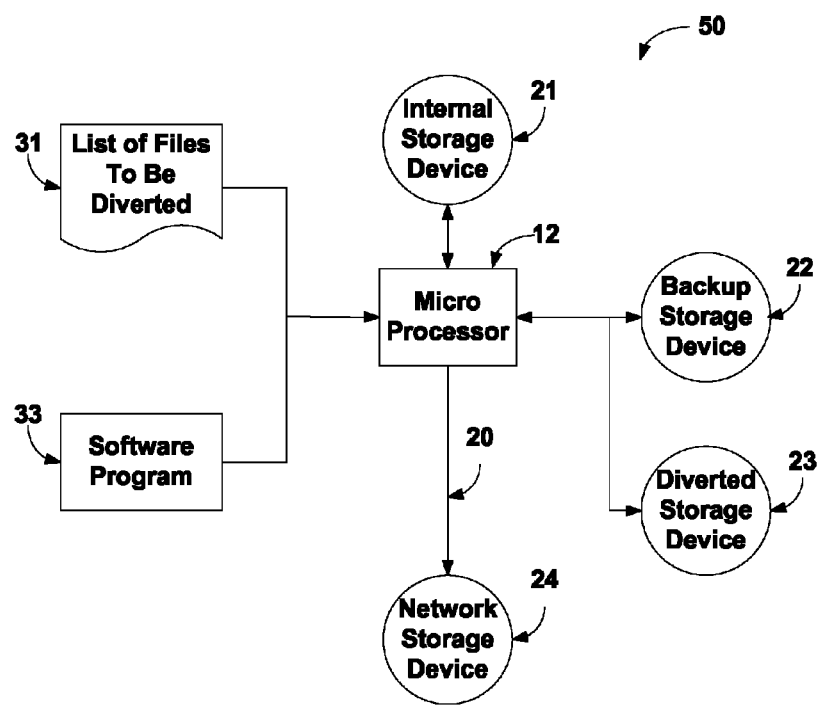

FIG. 4 is a schematic representation of an aspect of the invention where by a single list determines which files are diverted to a storage device other than the storage device being used as the backup storage device.

Figure 5:
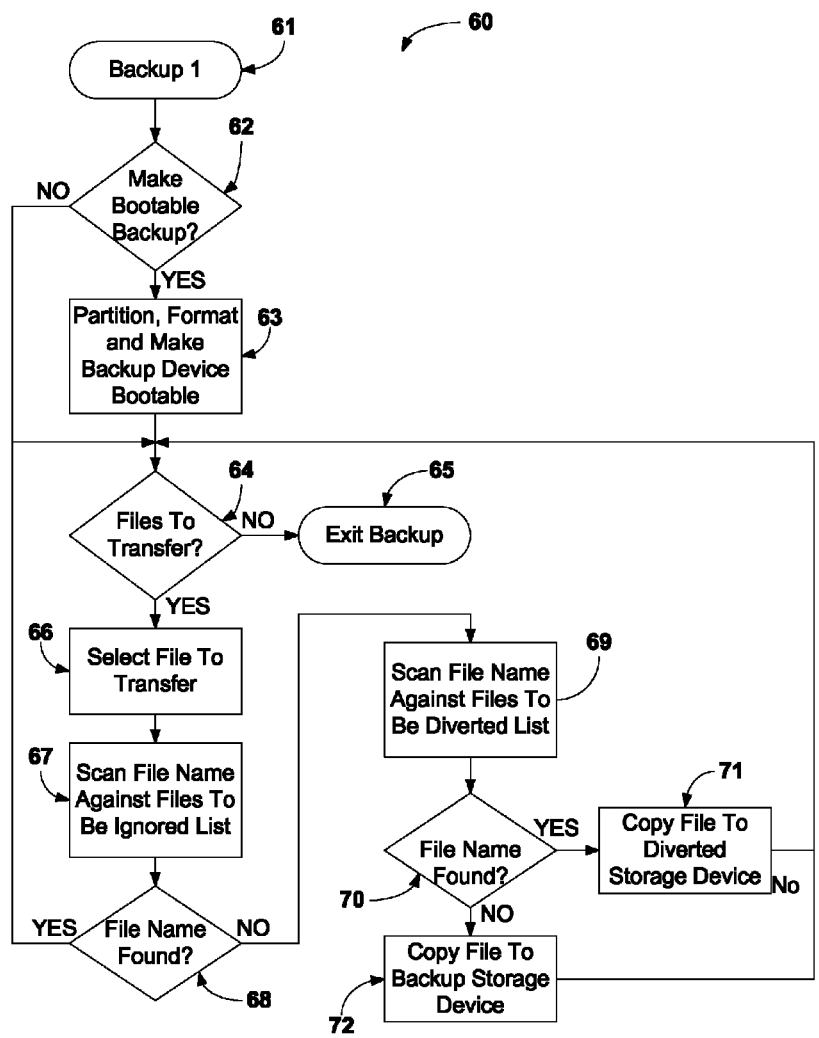

FIG. 5 is a flowchart depicting a basic logic flow of the invention where a single list determines which files are diverted to a storage device other than the storage device being used as the backup storage device and which files are not to be transferred.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
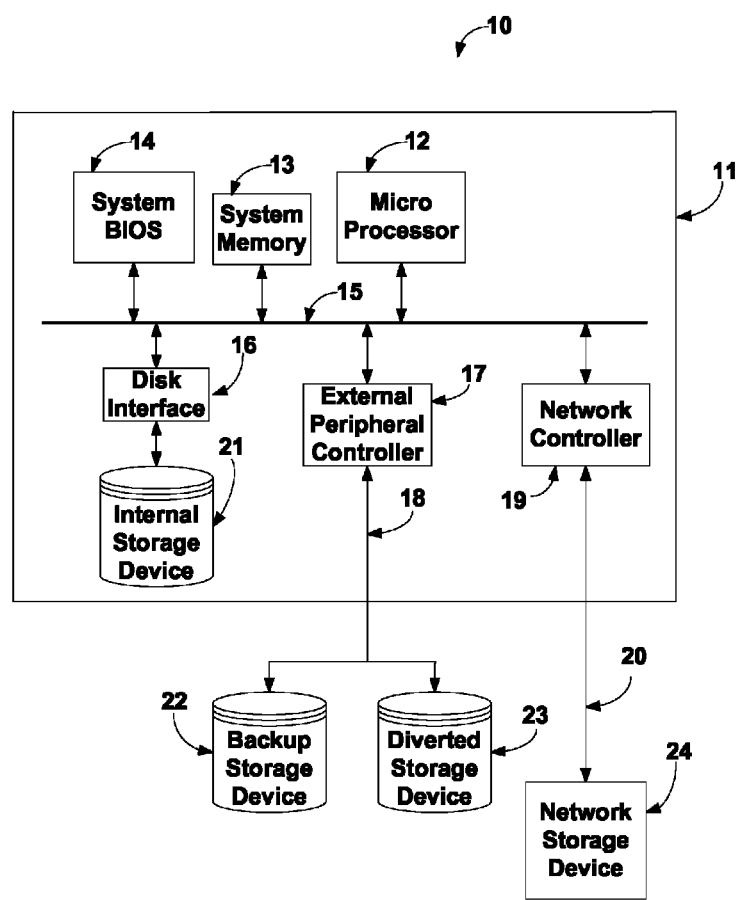
FIG. 1 is a schematic depiction of a typical personal computer system with internal storage, external storage having storage physically attached to the personal computer and storage residing across a network.

Now referencing FIG. 1 where 10 is a schematic representation of a typical personal computer where said personal computer is typical of a platform where the invention would be used. In FIG. 1, 11 is a personal computer system consisting of internal system bus 15 to which is connected a number of components that make said personal computer 11 operational. These components include a processor 12 which executes control programs including an operating system and application programs, system bios 14 which contains startup and boot software, system memory 13 which provides temporary storage for said operating system and said application programs, disk interface 16 which provides the interface between internal storage device 21 and internal system bus 15, external peripheral controller 17 which provides the interface between internal system bus and external bus 18 which allows external devices such as backup storage device 22 and diverted storage device 23 to be connected to personal computer system 11. Network controller 19 connects to internal system bus 15 and network which in turn connects to network storage device 24. Network 24 may be a hard wired network cable such as Ethernet or may be a wireless connection such as a RF link running under a protocol referred to as 802.11. Likewise, external bus 18 may be any of but not limited to hard wired external busses such as IEEE-1394 or USB.

Figure 2:
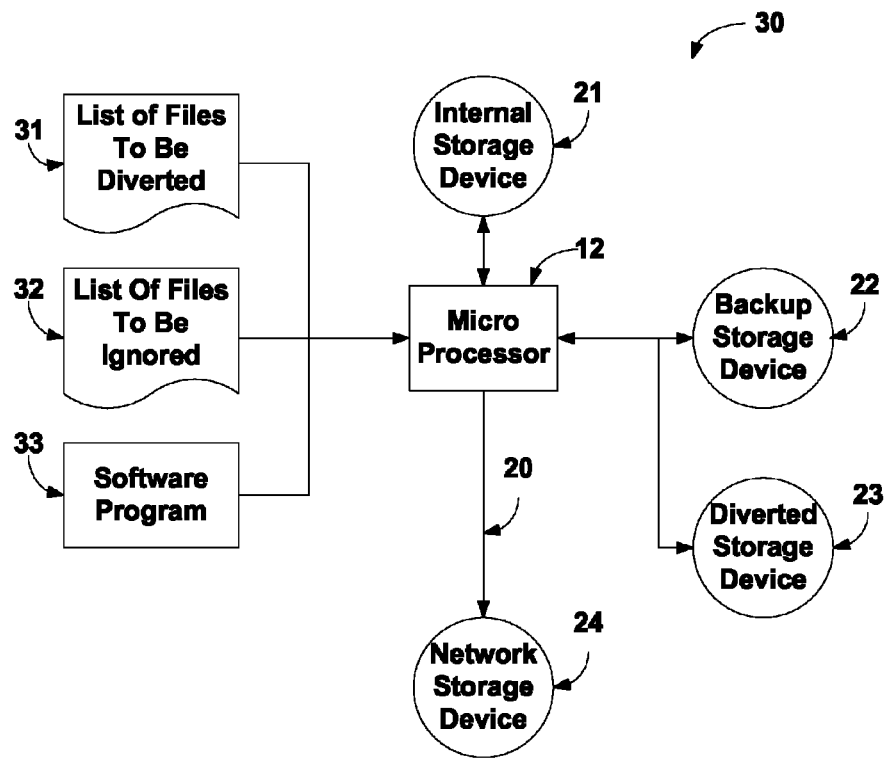
FIG. 2 is a schematic representation of an aspect of the invention where by two lists determine which files are diverted to a storage device other than the storage device being used as the backup storage device and which files are not to be transferred.

FIG. 2 shows a schematic representation 30 of an embodiment of the invention in which 4 storage devices are present and in which internal storage device 21 is the system storage device in personal computer 11, network storage device 24 is a storage device which may be a NAS (network attached storage) device, backup storage device 22 and diverted storage device 23 are externally attached storage devices and may be rotating magnetic hard disk drives or any of several different commonly used storage devices.

In this embodiment of the invention, software program 33 executing on processor 12 copies at least some files residing on internal storage device 21 to backup storage device 22, diverted storage device 23, network storage device 24 and some files will not be copied to either backup storage device 22 or diverted storage device 23 or network storage device 24.

To accomplish this task, list of files to ignore 32 contains a list of files that software program 33 executing on processor 12 will ignore or not copy to either backup storage device 22 or diverted storage device 23. The list of files may contain complete path names including the root directory and all subdirectories and the name and extension of one or more files. The list of files may also be composed of only file extensions such that groups of files without regard to their path or file name may be ignored and not copied to any other storage device.

Any file whose identity does not appear on files to ignore 32 will be further filtered by list of files to be diverted 31. The list of files may contain complete path names including the root directory and all subdirectories and the name and extension of one or more files. The list of files to be diverted 31 may also be composed of only file extensions such that groups of files without regard to their path or file name may be copied onto diverted storage device 23 instead of onto backup storage device 22.

In another aspect of this embodiment of the invention, software program 33 executing on processor 12 may, prior to beginning the file copy, partition and format backup storage device 22 and/or diverted storage device 23 such that the partitioned and formatted storage device(s) may be bootable if the appropriate files are copied from internal storage device to that device(s) and may be used to replace internal storage device 21 on personal computer 11 or on another personal computer.

In another aspect of this embodiment of the invention, software program 33 may use network storage device 24 as the target storage device instead of backup storage device 22 thereby making network storage device 24 the backup storage device.

In another aspect, software program 33 may use network storage device 24 as the diverted storage device used instead of diverted storage device 23 thereby making network storage device 24 the diverted storage device.

FIG. 3 shows a schematic representation 40 of an embodiment of the invention in which backup storage device 22 is now represented as backup storage devices 45 and diverted storage device 23 is not represented as diverted storage devices 46.

In this embodiment of the invention, backup storage devices 45 is a set of storage devices that may be attached to personal computer 11 through a single bus interface as shown or through multiple bus interfaces which are not shown but mentioned for reference. Also in this embodiment diverted storage devices 46 is a set of storage devices that may be attached to personal computer 11 through a single bus interface as shown or through multiple bus interfaces which are not shown but mentioned for reference.

Also in this embodiment of the invention there is shown lists of files to be backed up 41 where each list contains some grouping of files that are to be transferred to either one or more of backup storage devices 45 or one or more of diverted storage devices 46.

In this embodiment, each individual list of files contained in lists of files to be backed up 41, could be additional files from other storage devices that are to be placed on one of the backup storage devices 45. For example, some of the files on a given list contained in lists of files to be backed up 41 may be references to files contained on network storage device 24.

This feature of the invention would for example, allow an IT department to have a corporate image storage device which would be used to create at least a minimum backup storage device that is bootable and to customize each bootable storage device with sets of data files that may reside on network storage device24.

In this scenario, the IT department could create base storage devices that are bootable and contain the corporate software suites. Particular storage devices could then be configured with different databases used by computers that would be assigned to sales, customer service, engineering, personal aides, etc.

In this embodiment of the invention, software program 44 executing on processor 12 will copy at least some files residing on internal storage device 21 to backup storage devices 45 and diverted storage devices 46 and some files will not be copied to either backup storage devices 45 or diverted storage devices 46.

To accomplish this task, list of files to be ignored 33 may contain complete path names including the root directory and all subdirectories and the name and extension of one or more files or the list of files may also be composed of only file extensions such that groups of files without regard to their path or file name that software program 44 executing on processor 12 will ignore or not copy to either backup storage devices 45 or diverted storage devices 46 any file appearing on list of files to be ignored 33.

Any file whose identity does not appear on list of files to be ignored 33 will be filtered by lists of files to be diverted 42 which may contain complete path names including the root directory and all subdirectories and the name and extension of one or more files or the lists of files to be diverted 42 may also be composed of only file extensions such that groups of files without regard to their path or file name that software program 44 executing on processor 12 will copy onto one or more of diverted storage devices 46 instead of onto one or more of backup storage devices 45.

Any file whose identity does not appear on lists of files to be diverted 42 will be filtered by lists of files to be backed up 41 which may contain complete path names including the root directory and all subdirectories and the name and extension of one or more files or the lists of files to be backed up 41 may also be composed of only file extensions such that groups of files without regard to their path or file name that software program 44 executing on processor 12 will copy onto one or more of backup storage devices 45.

In this aspect of the present embodiment of the invention, lists of files to be backed up 41 may have a single list of files to be backed up or targeted to each of the storage devices comprising backup storage devices 45. This feature allows for software program 44 to create multiple bootable backup storage devices where each storage device contains a basic set of software and different sets of other files tailored to specific functional requirements.

Now referencing FIG. 4 where 30 is a schematic representation of an embodiment of the invention in which 4 storage devices are present and in which internal storage device 21 is the system storage device in personal computer 11, network storage device 24 is a storage device which may be a NAS (network attached storage) device, backup storage device 22 and diverted storage device 23 are externally attached storage devices and may be rotating magnetic hard disk drives or any of several commonly used storage devices. In this somewhat simplified embodiment of the invention, software program 33 executing on processor 12 will control copying all of the files residing on internal storage device 21 to backup storage device 22 with the exception of files copied to diverted storage device 23 or to network storage device 24.

To accomplish this task, all files contained on internal storage device 21 will be filtered by list of files to be diverted 31. The list of files may contain complete path names including the root directory and all subdirectories and the name and extension of one or more files. The list of files to be diverted 31 may also be composed of only file extensions such that groups of files without regard to their path or file name may be copied onto diverted storage device 23 instead of onto backup storage device 22.

In another aspect of this embodiment of the invention, software program 33 executing on processor 12 may, prior to beginning the file copy, partition and format backup storage device 22 and/or diverted storage device 23 such that the partitioned and formatted storage device(s) may be bootable if the appropriate files are copied from internal storage device to that device(s) and may be used to replace internal storage device 21 on personal computer 11 or on another personal computer.

In another aspect of this embodiment of the invention, software program 33 may use network storage device 24 as the target storage device used instead of backup storage device 22 thereby making network storage device 24 the backup storage device.

In another aspect of this embodiment of the invention, software program 33 may use network storage device 24 as the diverted storage device used instead of diverted storage device 23 thereby making network storage device 24 the diverted storage device.

Now referring to FIG. 5 where a logic flowchart depicting an aspect of the invention in which a backup of internal storage device 21 is performed where files may be copied to both a backup storage device and a diverted storage device. This depiction also covers the processing of a list of files to be ignored and a list of files to be diverted and includes the option of making the backup storage device bootable.

In this flowchart 60, the software program begins execution at entry point start backup 61. Decision block of whether to "make bootable backup" 62 will either query the user for a decision or query a variable which can consist of a value in a configuration file, a variable contained on a command line argument, or any other means for communicating an option or input value to a software program. If decision block make bootable backup 62 determines that the backup storage device should be a bootable device then control will fall through to processing block partition, format and make backup device bootable 63.

Processing block partition, format and make backup device bootable 63 partitions the backup storage device and preload the required boot and volume loaders and format the backup storage device such that the file system is present. In another embodiment of the invention, partition, format and make backup device bootable 63 will also transfer the operation system from the internal storage device 21 or will transfer an operating system from some other storage device as specified by a value in a configuration files, a variable contained on a command line argument, or any other means for communicating an option or input value to a software program. After processing block partition, format and make backup device bootable 63 is finished control will fall through the decision block files to transfer? 64.

If decision block make bootable backup 62 determined that the backup storage device was not to be made bootable it will transfer control to decision block files to transfer 64.

Decision block files to transfer? 64 keeps tracks of the files contained on internal storage device 21. Decision block files to transfer? 64 notes each file transferred or ignored and when all files contained on internal storage device 21 have been processed, it will transfer control to exit point exit backup 65. If all of the files contained on internal storage device 21 have not been transferred then decision block files to transfer? 64 will transfer control to processing block select file to transfer 66.

Processing block select file to transfer 66 will select a file from the file system on internal storage device 21 and transfer control to processing block scan file name against files to ignored list 67. This processing block will compare the name of the file selected to transfer against the list of files contained on the list of files to be ignored.

The list of files to be ignored (files to ignore 32 in FIG. 2 and list of files to be ignored 43 in FIG. 3) may be configured such that it may contain complete path names including the root directory and all subdirectories and the name and extension of one or more files or the list of files may also be composed of only file extensions such that groups of files without regard to their path or file name that software program (software program 33 in FIG. 2 and software program 44 in FIG. 3) executing on processor 12 will ignore or not copy to any of the backup storage device(s) or diverted storage device(s).

Once processing block scan file name against files to be ignored list 67 has processed the file name against the list of files to be ignored control will be transferred to decision block file name found? 68. If decision block file name found? 68 determines that the name of the file to be transferred was found on the files to be ignored list control will be transferred to decision block files to transfer? 64 where the process will begin again.

If decision block file name found? 68 determines that the name of the file to be transferred was not found on the files to be ignored list control will be transferred to processing block scan file name against files to be diverted list 69.

Processing block scan file name against files to be diverted list 69 will compare the name of the file selected to transferred against the list of files contained on the list of files to be diverted.

The list of files to be diverted (files to be diverted31 in FIG. 2 and list of files to be diverted 41 in FIG. 3) may be configured such that it may contain complete path names including the root directory and all subdirectories and the name and extension of one or more files or the list of files may also be composed of only file extensions such that groups of files without regard to their path or file name that software program (software program 33 in FIG. 2 and software program 44 in FIG. 3) executing on micro processor 12 will copy the file to any of diverted storage device(s).

Once processing block scan file name against files to be diverted list 69 has processed the file name against the list of files to be ignored control will be transferred to decision block file name found? 70.

If decision block file name found? 70 determines that the name of the file to be transferred was not found on the files to be diverted list control will be transferred to processing block copy file to backup storage device 72. If decision block, file name found? 70, determines that the name of the file to be transferred was found on the files to be diverted list control will be transferred to processing block copy file to diverted storage device 71.

Processing block copy file to backup storage device 72 will copy the file to be transferred from internal storage device 21 to the specified backup storage device. After the file transfer is complete, control will be transferred to decision block files to transfer? 64.

Processing block copy file to diverted storage device 72 will copy the file to be transferred from internal storage device 21 to the specified diverted storage device. After the file transfer is complete, control will be transferred to decision block files to transfer? 64.

Equivalent elements can be substituted for the ones set forth above such that they perform in substantially the same manner in substantially the same way for achieving substantially the same result.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example forms of hard drives can be used, and this technique can be used on other kinds of computing systems beyond the ones specifically mentioned herein.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory su.ch as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

A least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to computer system 550 from a network server via communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system comprising:
a computer having a first storage device as a primary storage device for said personal computer;
said computer running a routine that accesses files on a shared storage device, said shared storage device having operating files thereon, and also accesses a second storage device as a designated backup storage device and accesses a third storage device as a designated diverted files storage device;
said computer operating to perform a backup to said second and third storage devices, by creating a first list of files to be copied to said third storage device as said diverted files storage device, a second list of files to be ignored during backup, and where said computer operates to check a name of said file to be transferred against said second list of files and if said file name appears on said second list of files, said file will not be transferred, and said computer operates to check the name of said file which is not ignored against said first list of files and if said file name appears on said first list of files said file will be transferred to said designated diverted files storage device, else said file will be transferred to said designated backup storage device, and where said first list of files also includes a list of operating files from said shared storage device, where said operating files are automatically stored on said designated backup storage device along with other files from said computer, where said designated backup storage device is partitioned and formatted prior to the transfer of any files such that it becomes a bootable storage device after said backup that includes files from said shared storage device.

2. The system of claim 1 where said designated backup storage device is a network attached storage (NAS) device.

3. The system of claim 1 where said designated backup storage device is a remote storage device connected over a network.

4. The system of claim 1 where said designated backup storage device is an attached storage device attached to said computer through an external bus which is one of USB; IEEE-1394; or SCSI.

5. The system of claim 1 where said first list of files and said second list of files are ordered by file type.

6. The system of claim 1 where said first list of files and said second list of files are ordered by directory and subdirectory.

7. The system of claim 1 where said first list of files and said second list of files are ordered randomly.

8. The system of claim 1 where said computer comprises:
a microprocessor device;
a flash memory device containing BIOS software;
a random memory device for containing software to be executed and data to be processed;
an internal bus;
at least a first external bus; and
at least a first network connection.

9. A system for creating a backup of a storage device where at least some files from a primary storage device may be directed to any of a plurality of storage devices other than a plurality of designated backup storage devices comprising:
a computer having a first storage device, where said first storage device is a primary storage device for said computer;
said computer running a routine that accesses files on a first plurality of attached storage devices, where said first plurality of attached storage devices include plurality of designated backup storage sections;
said computer running a routine that accesses files on a second plurality of attached storage devices where said second plurality of attached storage devices include a plurality of designated diverted files storage sections;
said computer running a routine that accesses files on a shared storage device, having operating files thereon,
said computer operating to backup files on said primary storage device to said plurality of designated backup storage devices, said computer having a first plurality of lists of files where each of the first lists has a set of names of files to be back up to at least one of the plurality of designated backup storage devices, a second plurality of lists of files, a first single list of files defining to be ignored during execution of said routine, where said computer checks a name of said file to be transferred against said first single list of files to be ignored and if said file name appears on said first single list of files to be ignored, said file will not be transferred, and checking said name of said file will be checked against said second plurality of lists of files and if said file name appears on said second plurality of lists of files, said file will be transferred to at least one of said plurality of designated diverted files storage devices, else said file will be transferred at least one of said plurality of designated backup storage devices, where different lists represent different applications, where said designated backup storage sections includes a bootable storage device and where said list also includes a list of operating files from said shared storage device, where said operating files are automatically stored on said designated backup storage sections along with other files from said computer, where said designated backup storage sections is partitioned and formatted prior to the transfer of any files such that it becomes a bootable storage device after said backup that includes files from said shared storage device.

10. The system of claim 9, where said designated backup storage sections includes a bootable storage device and where said list also includes a list of operating files from a shared storage device that is accessible by multiple computers over a network, where said operating files are automatically stored on said designated backup storage sections along with other files from said computer, where said designated backup storage section is partitioned and formatted prior to the transfer of any files such that it becomes a bootable storage device after said backup that includes files from said shared storage device.

11. A system for creating a backup of a storage device where at least some files from a primary storage device may be directed to any of a plurality of storage devices other than a plurality of designated backup storage devices comprising:
a computer having a first storage device, where said first storage device is a primary storage device for said computer;
a first plurality of attached storage devices, where said first plurality of attached storage devices include plurality of designated backup storage sections;
a second plurality of attached storage devices where said second plurality of attached storage devices include a plurality of designated diverted files storage sections;
said computer operating to backup files on said primary storage device to said plurality of designated backup storage devices, said computer having a first plurality of lists of files where each of the first lists has a set of names of files to be back up to at least one of the plurality of designated backup storage devices, a second plurality of lists of files, a first single list of files defining to be ignored during execution of said first software program, where said computer checks a name of said file to be transferred against said first single list of files to be ignored and if said file name appears on said first single list of files to be ignored, said file will not be transferred, and checking said name of said file will be checked against said second plurality of lists of files and if said file name appears on said second plurality of lists of files, said file will be transferred to at least one of said plurality of designated diverted files storage devices, else said file will be transferred at least one of said plurality of designated backup storage devices, where different lists represent different applications where each of said plurality of designated backup storage devices is partitioned and formatted prior to the transfer of any files to them, such that each becomes a bootable storage device after execution of said first software program, and such that a first storage device receives files from a first list and is bootable for a first application and a second storage device receives files from a second list and is bootable for a second application different than the first application.

12. The system of claim 11 where at least one of said plurality of designated backup storage devices is a network attached host device otherwise known a network attached storage (NAS) device.

13. The system of claim 11 where at least one of said plurality of designated backup storage devices is a remote storage device residing on a local area network or on the internet.

14. The system of claim 11 where said plurality of designated backup storage devices is an attached storage device attached to said computer through an external bus such as but not limited to: USB; IEEE-1394; and SCSI.

15. The system of claim 11 where said first plurality of lists of files and said second plurality of lists of files are ordered by file type.

16. The system of claim 11 where said first plurality of lists of files and said second plurality of lists of files are ordered by directory and subdirectory.

17. The system of claim 11 where said first plurality of lists of files and said second plurality of lists of files are ordered randomly.

18. A system as in claim 11, wherein said computer comprising a microprocessor device;
a flash memory device containing BIOS software;
a random memory device for containing software to be executed and data to be processed;
an internal bus;
at least a first external bus;
at least a first network connection.

* * * * *